(12) United States Patent
Smith

(10) Patent No.: US 7,396,035 B1  
(45) Date of Patent: Jul. 8, 2008

(54) TRAILER HITCH ALIGNMENT DEVICE

(76) Inventor: Rick L. Smith, 4455 Blacktail Rd., Dillon, MT (US) 59725

( * ) Notice: Subject to any disclaimer, the term of this patent is extended or adjusted under 35 U.S.C. 154(b) by 0 days.

(21) Appl. No.: 11/585,628

(22) Filed: Oct. 24, 2006

Related U.S. Application Data

(63) Continuation of application No. 10/983,163, filed on Nov. 5, 2004, now abandoned.

(60) Provisional application No. 60/517,998, filed on Nov. 5, 2003.

(51) Int. Cl.  
*B60D 1/36* (2006.01)  
*B60D 1/40* (2006.01)  
*B60Q 1/00* (2006.01)

(52) U.S. Cl. ........................ 280/477; 340/431

(58) Field of Classification Search .............. 280/477, 280/DIG. 14; 33/286, 264; 340/431, 425.5  
See application file for complete search history.

(56) References Cited

U.S. PATENT DOCUMENTS

| | | | |
|---|---|---|---|
| 4,938,495 A | | 7/1990 | Beasley et al. |
| 5,285,205 A | * | 2/1994 | White ................... 340/932.2 |
| 5,455,557 A | | 10/1995 | Noll et al. |
| 5,461,471 A | | 10/1995 | Sommerfeld |
| 5,729,194 A | * | 3/1998 | Spears et al. ............... 340/431 |
| 5,951,035 A | | 9/1999 | Phillips, Jr. et al. |
| 5,967,596 A | * | 10/1999 | Knoop ..................... 296/164 |
| 6,120,052 A | | 9/2000 | Capik et al. |
| 6,176,505 B1 | | 1/2001 | Capik et al. |
| 6,178,650 B1 | | 1/2001 | Thibodeaux |
| 6,222,457 B1 | * | 4/2001 | Mills et al. ............... 340/686.1 |
| 6,252,497 B1 | | 6/2001 | Dupay et al. |
| 6,259,357 B1 | * | 7/2001 | Heider ..................... 340/431 |
| 6,386,572 B1 | | 5/2002 | Cofer |
| 6,480,104 B1 | * | 11/2002 | Wall et al. .................. 340/431 |
| 6,587,041 B1 | | 7/2003 | Brown, Jr. |
| 6,769,709 B1 | * | 8/2004 | Piper et al. ................. 280/477 |
| 6,886,847 B2 | * | 5/2005 | Piper et al. ................. 280/477 |
| 6,900,724 B2 | | 5/2005 | Johnson |
| 2003/0051654 A1 | | 3/2003 | Jarasek et al. |
| 2004/0182619 A1 | | 9/2004 | McGregor et al. |
| 2004/0252019 A1 | | 12/2004 | Paull |

* cited by examiner

*Primary Examiner*—Lesley D. Morris  
*Assistant Examiner*—Daniel Yeagley  
(74) *Attorney, Agent, or Firm*—Richard C. Conover

(57) ABSTRACT

The present invention includes a first laser light source mounted to a towing vehicle and oriented to direct a first laser light beam towards a trailer to impinge on a first marker spot located on a hitch coupler mounted to the trailer. A second laser light source is also mounted to the towing vehicle in spaced apart relation with the first laser light source and oriented to direct a second laser light beam towards the trailer at an angle to the first light beam to impinge on a second marker spot on the trailer when the hitch and hitch coupler are aligned. When the towing vehicle is moved towards the trailer with the first laser beam impinging on the first marker spot and further moved towards the trailer until the second laser beam impinges on the second marker spot, the hitch coupler is aligned with the hitch.

2 Claims, 4 Drawing Sheets

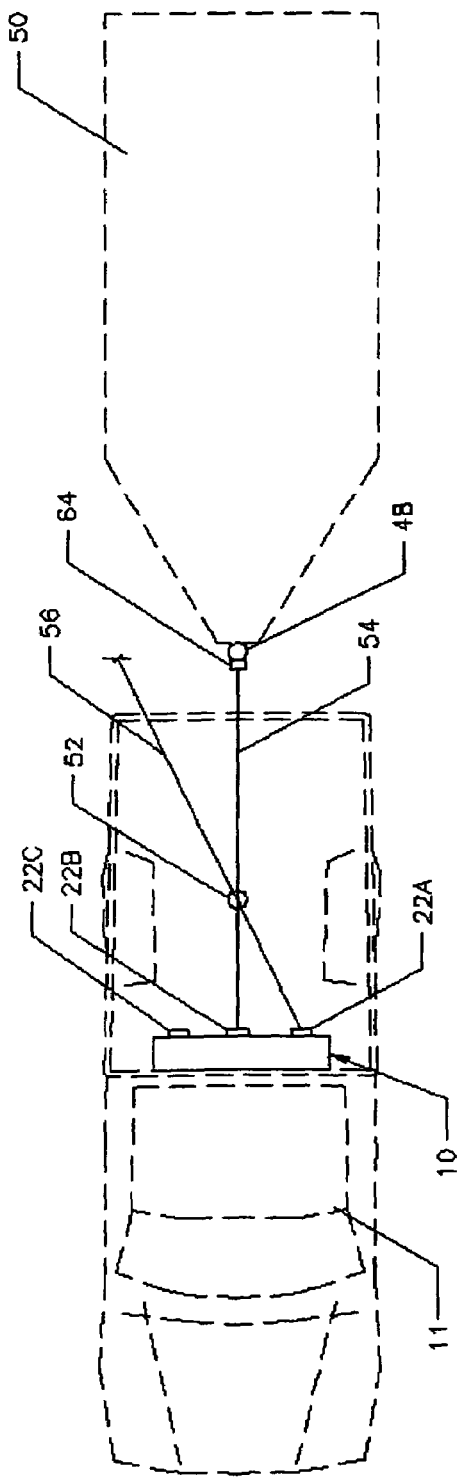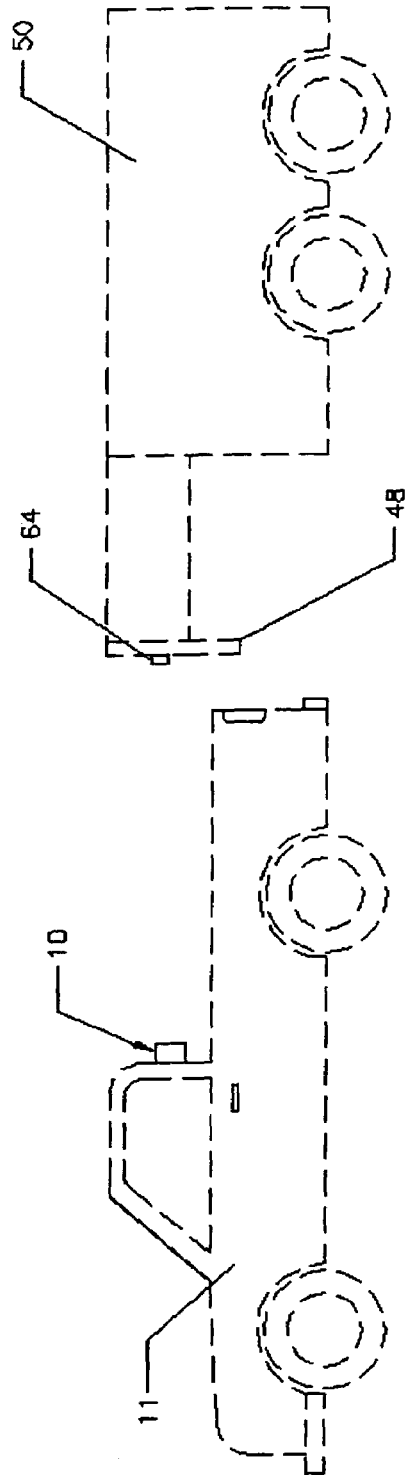
FIG 1B
FIG 1A

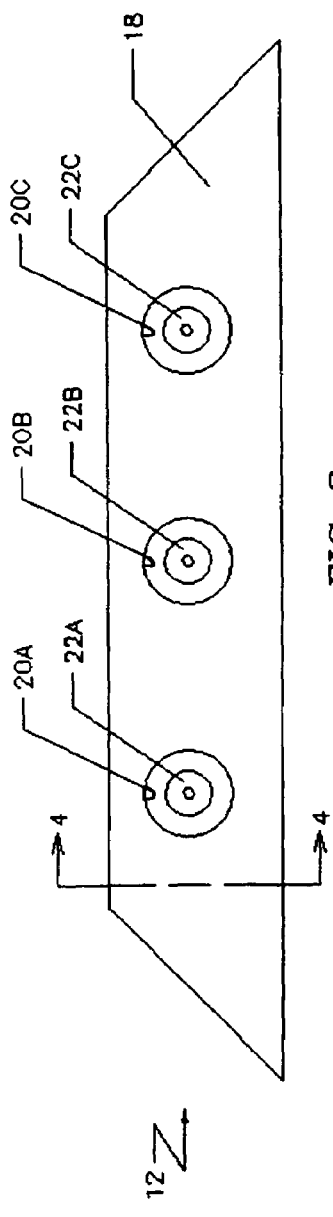
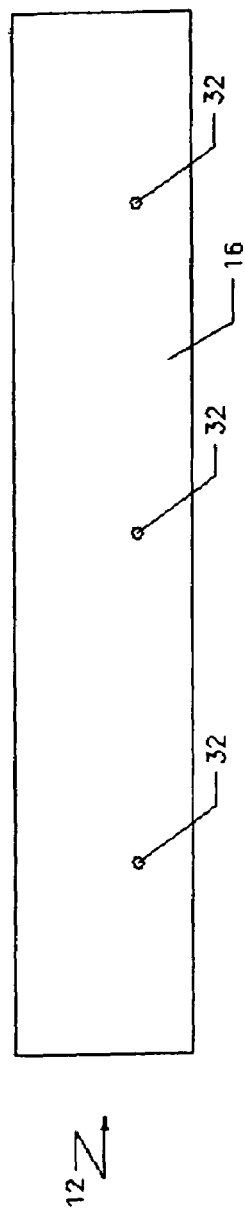
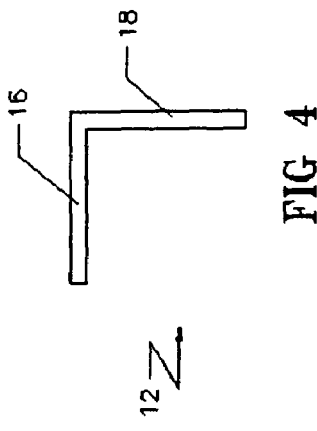

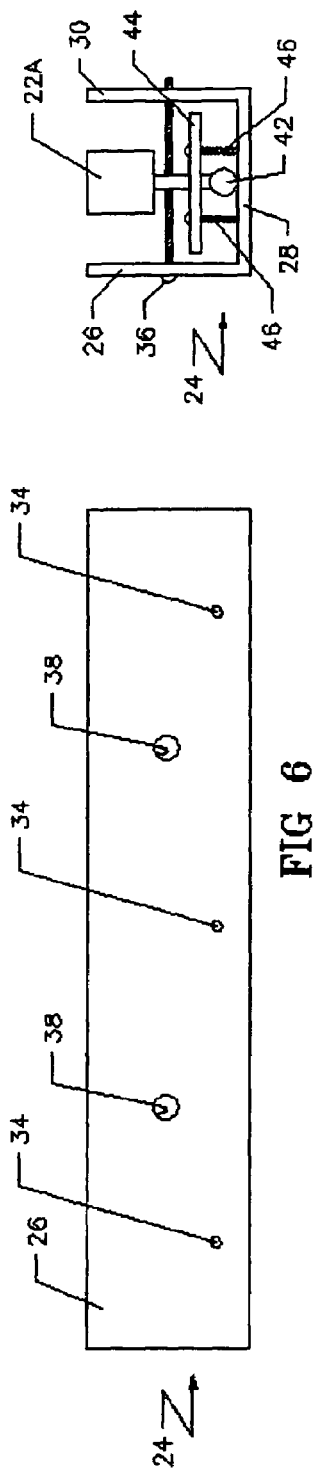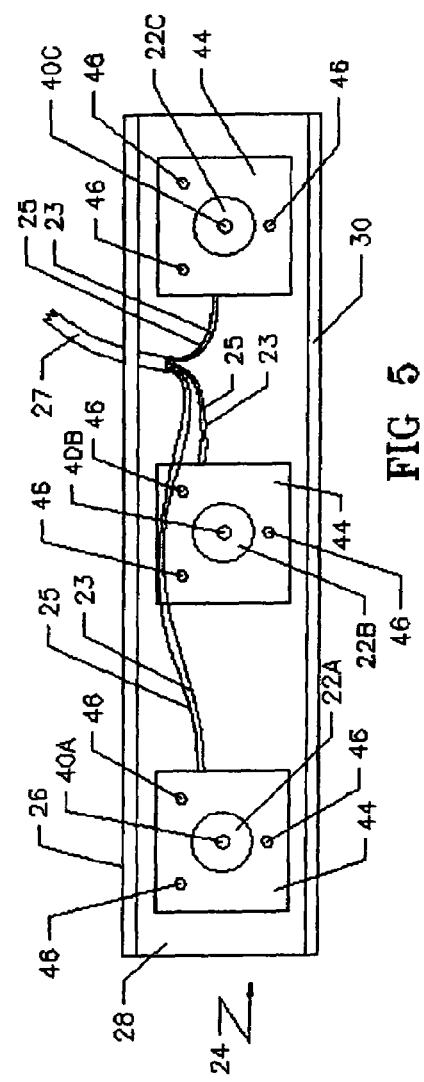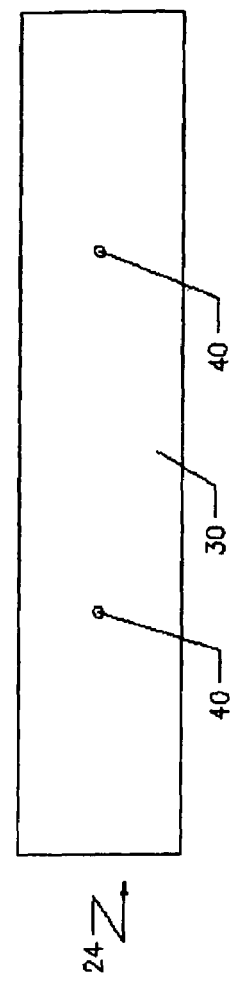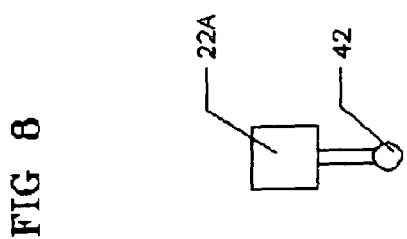

TRAILER HITCH ALIGNMENT DEVICE

This application is a continuation of U.S. patent application Ser. No. 10/983,163 filed Nov. 5, 2004 now abandoned which claimed the benefit of provision application Ser. No. 60/517,998, filed Nov. 5, 2003.

BACKGROUND OF THE INVENTION

The present invention relates to a laser device used in aligning a hitch of a towing vehicle with a hitch coupler of a trailer to permit trailer coupling in a fast and easy manner.

When a trailer having a hitch coupler is to be hitched to a towing vehicle having a hitch, it is difficult to align the hitch with the hitch coupler because the driver of the towing vehicle is driving in a reverse direction and care must be exercised in aligning the hitch and hitch coupler together before the hitch coupler can be secured to the hitch.

There are many known systems, mainly mechanical systems, for helping in aligning the hitch with the hitch coupler. An example of this type of device is shown in United States Patent Application Publication No. US 2003/0051654 A1. An improvement on these mechanical systems was made when using light sources for use in the alignment process. Examples of these types of systems are shown in U.S. Pat. Nos. 6,120,052 and 6,386,572 B1.

The present invention provides a significant improvement to known systems by providing an easy and convenient system to permit a user to accurately and quickly align a trailer coupler with a trailer hitch.

SUMMARY OF THE INVENTION

The present invention relates to a trailer hitch alignment device which uses a pair of laser beams to properly align a hitch mounted to a towing vehicle with a hitch coupler mounted to a trailer. The invention includes a first laser light source mounted to the towing vehicle and oriented to direct a first laser light beam towards the trailer along a longitudinal axis of the trailer to impinge on a first marker spot located on the hitch coupler mounted to the trailer. A second laser light source is also mounted to the towing vehicle in spaced apart relation with the first laser light source and oriented to direct a second laser light beam towards the trailer at an angle to the first light beam to impinge on a second marker spot on the trailer when the hitch and hitch coupler are aligned. When the towing vehicle is moved towards the trailer with the first laser beam impinging on the first marker spot and further moved towards the trailer until the second laser beam impinges on the second marker spot, the hitch coupler is aligned with the hitch.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 1A is a schematic drawing depicting a towing vehicle and a fifth wheel trailer with a laser device according to the present invention mounted to the towing vehicle;

FIG. 1B is a top view of the schematic drawing shown in FIG. 1A;

FIG. 2 is a front elevational view of a cover used with the present invention;

FIG. 3 is a top view of the cover shown in FIG. 2;

FIG. 4 is a cross sectional view taken along the line 4-4 in FIG. 2;

FIG. 5 is a front elevational view of the present invention with the cover removed;

FIG. 6 is a top view of the present invention shown in FIG. 5;

FIG. 7 is a bottom view of the present invention shown in FIG. 5;

FIG. 8 is a left hand view of the present invention shown in FIG. 5;

FIG. 9 is an elevational view of a laser light source used with the present invention;

DESCRIPTION OF PREFERRED EMBODIMENTS

Figure 11:
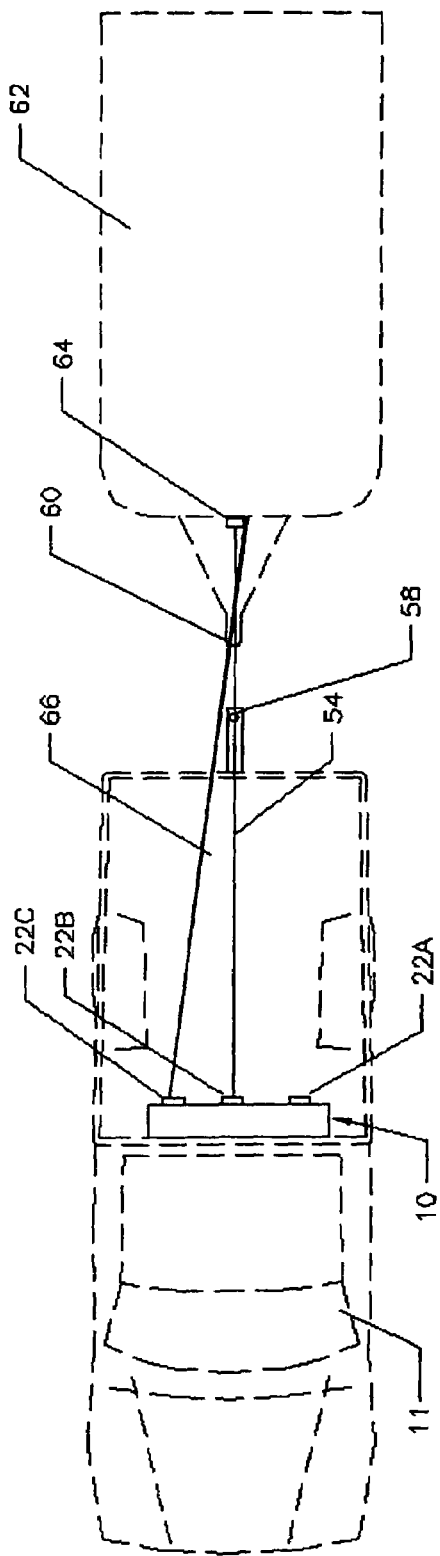
FIG. 11 is a top schematic view as shown in FIG. 10 with the trailer separated from the towing vehicle.

A laser device 10, according to the present invention, is shown in FIG. 1 where, in a preferred embodiment, it is attached to the rearward side of a cab provided on a conventional pulling vehicle 11 such as a pick up truck. Device 10 is centered laterally across the cab of the truck immediately behind the cab of the truck.

The laser device 10 includes a cover 12 as shown in FIGS. 2 and 3. The cover 12 has a "L" shaped configuration as shown in FIG. 4 with a top wall 16 and a front wall 18. Wall 18 of cover 12 has three openings 20a, 20b and 20c, each opening receiving a laser light source 22a, 22b and 22c, respectively.

The cover 12 partially encloses a channel base member 24 shown in FIGS. 5 through 8. The channel base member 24 includes a top wall 26, a bottom wall 30 and a back wall 28. The cover 12 is placed on the channel base member 24 with the top wall 16 resting on top wall 26 of the channel base member 24 and the front wall 18 covering the space between channel base member walls 26 and 30.

Screws (not shown) are used to secure the cover 12 to the channel base member 24. The screws extend through openings 32 provided in cover top wall 16 and into threaded holes 34 provided in top wall 26 of the base channel member 24.

The channel base member 24 is secured to the towing vehicle with screws or bolts and nuts 36 (shown in FIG. 8) which extend through openings 38 provided in top wall 26 and further through openings 40 provided in bottom wall 30.

The laser light sources 22a, 22b and 22c include a housing for allowing the laser light to be directed outwardly through openings 40a, 40b, and 40c, respectively. At the end of the housing opposite the openings 40a, 40b, and 40c a stem is provided which is fixedly secured to a ball 42 as shown in FIGS. 8 and 9. A mounting plate 44 is provided for each of the laser light sources 22a, 22b and 22c. The mounting plate 44 has an opening therethrough sized to receive the stem of the laser light sources but also sized sufficiently small to prevent the ball 42 from passing through the opening. Three screws 46 are used for securing the mounting plate 44 to the back wall 28 of the channel base member 24. When the screws 46 are loosened the light source 22a and correspondingly the light sources 22b and 22c may be swivelled on the ball 42 to a desired position. At the desired position, the screws 46 are then tightened to secure the light source 22a, and correspondingly light sources 22b and 22c, in the desired position.

The laser light sources 22a, 22b, 22c are powered from a power source not shown. In a preferred embodiment the power source is a 12 volt battery used with the towing vehicle. A switch (not shown) is used to selectively activate all three laser light sources 22a, 22b, and 22c. The laser light sources are connected in parallel with wires 23 and 25 which are electrically connected to power cable 27, as shown in FIG. 5.

In operation, the laser device 10 is mounted, in a preferred embodiment, to the cab provided on a conventional pulling vehicle 11 with the laser light source 22b being centered laterally across the truck at the longitudinal axis of the truck, immediately behind the cab of the truck.

The following description will relate to the use of the laser light sources in aligning a fifth wheel trailer with the hitch of a towing vehicle. As shown in FIG. 1B, a trailer coupler 48 is mounted to a fifth wheel trailer 50. The towing vehicle 11 has a trailer hitch 52 mounted on the bed of the towing vehicle 11. The laser light source 22b provides a laser beam 54 and the laser light source 22a provides a laser beam 56. In order to properly orient the laser beams 54 and 56, the towing vehicle 11 must first be hitched to the fifth wheel trailer 50 with the trailer coupler 48 engaging the trailer hitch 52. When the fifth wheel trailer has been hitched to the towing vehicle 11, the laser beam 54 is oriented by loosening the plate 46 and swivelling the laser light source 22b so that the beam 54 is directed directly over the hitch 52 and centered on the upright trailer coupler 48. In a preferred embodiment, an alignment marker strip 64 is attached to the trailer coupler 48 at a central location and the laser beam 54 adjusted to impinge on the marker strip. The plate 46 is then tightened so that the laser light source 22b remains in this position.

As can be seen in FIG. 1B, with this orientation of laser light source 22b, the light beam 54 passes directly over the trailer hitch 52. Next, the laser beam 56 is oriented, again by loosening plate 46 and swivelling the light source 22a to the desired position, so that the light beam 56 is vertically aligned with the light beam 54 on marker strip 64. The plate 46 is then tightened to secure the laser light source 22a at the selected position. With this orientation the light beam 56 passes over the trailer hitch 52 as shown in FIG. 1B.

The two laser light sources 22a and 22b can now be used to align the towing vehicle 11 having the trailer hitch 52 with a hitch coupler 48 of the fifth wheel trailer 52.

When aligning the fifth wheel trailer with the towing vehicle, the vehicle 11 is driven in reverse until the laser beam 54 is centered on the marker strip 64 mounted to trailer coupler 48. Reverse movement is then continued until the laser beam 56 impinges on the marker strip 64 at a position vertically above the light beam 54. At this point, the trailer coupler 48 is directly above the trailer hitch 52 and can be lowered to hitch the fifth wheel trailer 52 to the towing vehicle 11.

Figure 10:
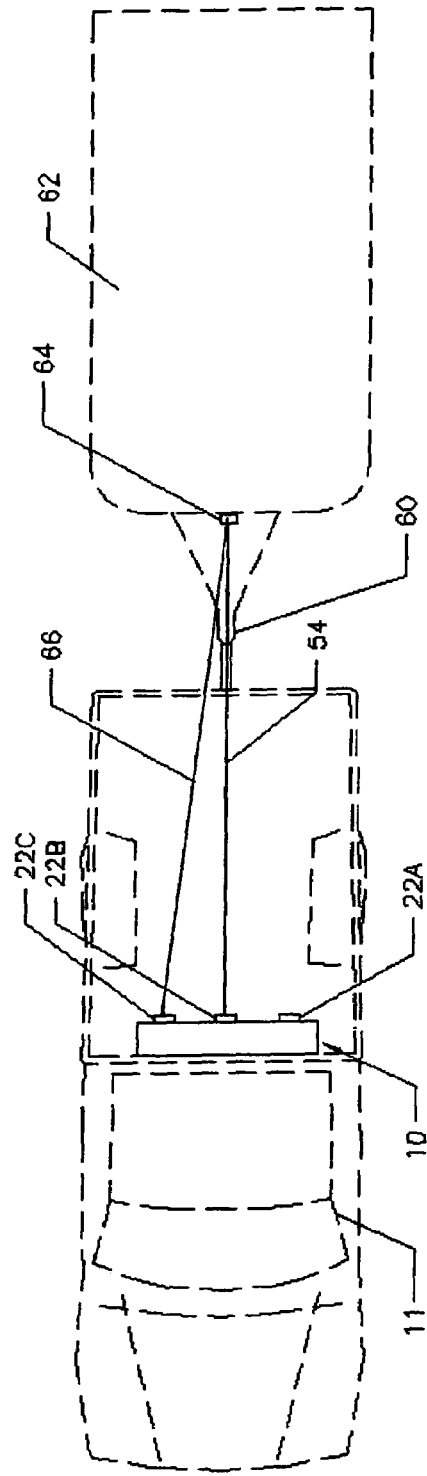
FIG. 10 is a top schematic view of a towing vehicle having the present invention mounted thereto together with a trailer having a ball hitch coupler.

The present system can also be used to align a ball trailer hitch 58 mounted to the towing vehicle 11 to a ball hitch coupler 60 mounted to a trailer 62 as shown in FIGS. 10 and 11. In using this device, it is convenient to use the alignment marker strip 64 mounted to the forward facing face of the trailer 62. In a preferred embodiment, the laser light sources 22b and 22c are used to align the ball trailer hitch 58 with the ball hitch coupler 60. As before, the trailer 62 is first hitched to the trailer ball hitch 58 of the towing vehicle 11 before aligning the light sources 22b and 22c. The laser beam 54 again is directed across the top of the ball trailer hitch 58 to impinge on the marker strip 64. Laser source 22c is then oriented, as above described, so that a laser light beam 66 impinges on the marker strip 64 at a position directly above the laser light beam 54.

With this arrangement, and when aligning the trailer 62 with the towing vehicle 11, the towing vehicle 11 is moved in a reverse direction until the light beam 54 is centered on the marker strip 64, as was done before with the fifth wheel trailer. The vehicle 11 is then continued in reverse with the light beam 54 centered on the marker strip 64 until the laser beam 66 impinges on the marker strip 64 at a position directly above the light beam 54 as shown in FIG. 11. At this position, the ball trailer hitch 58 is aligned with the ball hitch coupler 60. The coupler 60 may then be lowered onto the ball hitch 58.

The present invention can be used in a similar manner in hitching a towed vehicle having a tow bar to a towing vehicle. In this arrangement, the laser device 10 is mounted to the front of the towed vehicle with the laser beam 54 extending forwardly over the hitch coupler of the tow bar. The marker strip 64 is mounted on the towing vehicle vertically above the hitch provided with the towing vehicle. As before, the towed vehicle must be hitched to the towing vehicle to properly orient a second laser light source, either laser source 22a or 22c. Once the towed vehicle is hitched to the towing vehicle either light beam 56 or light beam 66 is oriented to impinge the marker strip 64 immediately above the light beam 54.

After aligning the light beam 56 or 66 with the marker strip 64, the laser light sources 22b and 22a or 22c can be used to align the towed vehicle with the towing vehicle for properly hitching the vehicles together. When using the laser device 10, in this manner, the towed vehicle is driven forwardly to orient the beam 54 on the marker 64. The towed vehicle is then continued to be driven forwardly until the selected laser beam 56 or 66 impinges on the marker strip immediately above the light beam 54. At this point the hitch and hitch coupler are properly aligned and may be joined to hitch the towed vehicle with the towing vehicle.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims:

I claim:

1. A laser device for aligning a hitch mounted to a towing vehicle having a longitudinal axis, the hitch being aligned with the longitudinal axis, and a hitch coupler mounted to a fifth wheel trailer comprising:
    a first laser light source mounted to the towing vehicle and oriented to direct a first laser light beam towards the fifth wheel trailer parallel with the longitudinal axis and across the hitch to impinge on a first marker spot located on the hitch coupler of the fifth wheel trailer; and
    a second laser light source mounted to the towing vehicle in spaced apart relation with the first laser light source and oriented to direct a second laser light beam towards the fifth wheel trailer in a generally horizontal direction and across the hitch at an angle to the first light beam to impinge on a second marker spot on the fifth wheel trailer when the hitch is directly aligned vertically underneath the hitch coupler.

2. The laser device according to claim 1 further including means for independently adjusting the orientation of the first and second laser light beams.

* * * * *